US011385727B2

(12) United States Patent
Thomas, III et al.

(10) Patent No.: US 11,385,727 B2
(45) Date of Patent: Jul. 12, 2022

(54) SCRIBING SHAFT SENSORS

(71) Applicant: Hewlett-Packard Development Company, L.P., Spring, TX (US)

(72) Inventors: Fred Charles Thomas, III, Fort Collins, CO (US); Jon Anderson, Fort Collins, CO (US); Owen Richard, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 46 days.

(21) Appl. No.: 16/771,005

(22) PCT Filed: Jan. 26, 2018

(86) PCT No.: PCT/US2018/015529
§ 371 (c)(1),
(2) Date: Jun. 9, 2020

(87) PCT Pub. No.: WO2019/147269
PCT Pub. Date: Aug. 1, 2019

(65) Prior Publication Data
US 2020/0371608 A1  Nov. 26, 2020

(51) Int. Cl.
*G06F 3/0354* (2013.01)
*G01L 1/22* (2006.01)

(52) U.S. Cl.
CPC ........ *G06F 3/03545* (2013.01); *G01L 1/2262* (2013.01)

(58) Field of Classification Search
CPC ............................ G06F 3/03545; G01L 1/2262
(Continued)

(56) References Cited

U.S. PATENT DOCUMENTS 3,915,015 A   10/1975  Crane et al.
5,505,005 A    4/1996  McMurtry et al.
(Continued)

FOREIGN PATENT DOCUMENTS

CN   204190857    3/2015
WO   WO-2007019600   2/2007

OTHER PUBLICATIONS

Reynaerts, D. et al. "Design of an advanced computer writing tool." In MHS'95. Proceedings of the Sixth International Symposium on Micro Machine and Human Science, pp. 229-234. IEEE, 1995.

(Continued)

*Primary Examiner* — Mark Edwards
(74) *Attorney, Agent, or Firm* — Fabian VanCott

(57) ABSTRACT

In one example in accordance with the present disclosure, an electronic input device is described. The electronic input device includes a scribing shaft disposed within a housing, the scribing shaft to translate along a longitudinal axis as a result of contact with a substrate. The electronic input device also includes an input sensor. The input sensor includes a plate secured within the housing. The plate elastically deforms responsive to the translation of the scribing shaft. A full-bridge strain gauge of the input sensor is disposed on a surface of the plate. The full-bridge strain gauge detects a deformation of the plate and outputs a corresponding signal, which corresponding signal varies dependent upon the amount of deformation of the plate. The input sensor also includes a failure protection device to limit the deformation of the plate to within a predetermined amount.

20 Claims, 15 Drawing Sheets

(58) Field of Classification Search
USPC .......................................................... 345/179
See application file for complete search history.

(56) References Cited

U.S. PATENT DOCUMENTS

| | | | |
|---|---|---|---|
| 5,548,092 A | | 8/1996 | Shriver |
| 5,576,502 A | * | 11/1996 | Fukushima ......... G06F 3/03545 |
| | | | 178/19.01 |
| 5,981,883 A | | 11/1999 | Shriver |
| 8,878,823 B1 | | 11/2014 | Kremin et al. |
| 2007/0025805 A1 | * | 2/2007 | Lapstun ............... B43K 29/004 |
| | | | 401/195 |
| 2015/0070330 A1 | | 3/2015 | Stern |
| 2017/0068339 A1 | | 3/2017 | Zimmerman et al. |

OTHER PUBLICATIONS

Toyozumi, N. et al. "Development of pen based interface system for digital operation." In 2015 IEEE/SICE International Symposium on System Integration (SII), pp. 593-598. IEEE, 2015.

\* cited by examiner

SCRIBING SHAFT SENSORS

BACKGROUND

Input devices are coupled to electronic devices such as computers, tablets, and other electronic devices. These input devices allow a user to input information to the electronic devices. One example of an input device is an electronic pen. The writing end of the electronic pen includes a tip that can be pressed on a surface, such as a touch-screen display. The contact force between the tip and the surface can be used to execute operations within an application, such as clicking on buttons/icons within the application. In some examples, the tip is moved across the surface, and a visual representation of the motion is displayed on the touch-screen display. In this fashion, the electronic pen can be used to write text, draw images, or interface with an application on the electronic device.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
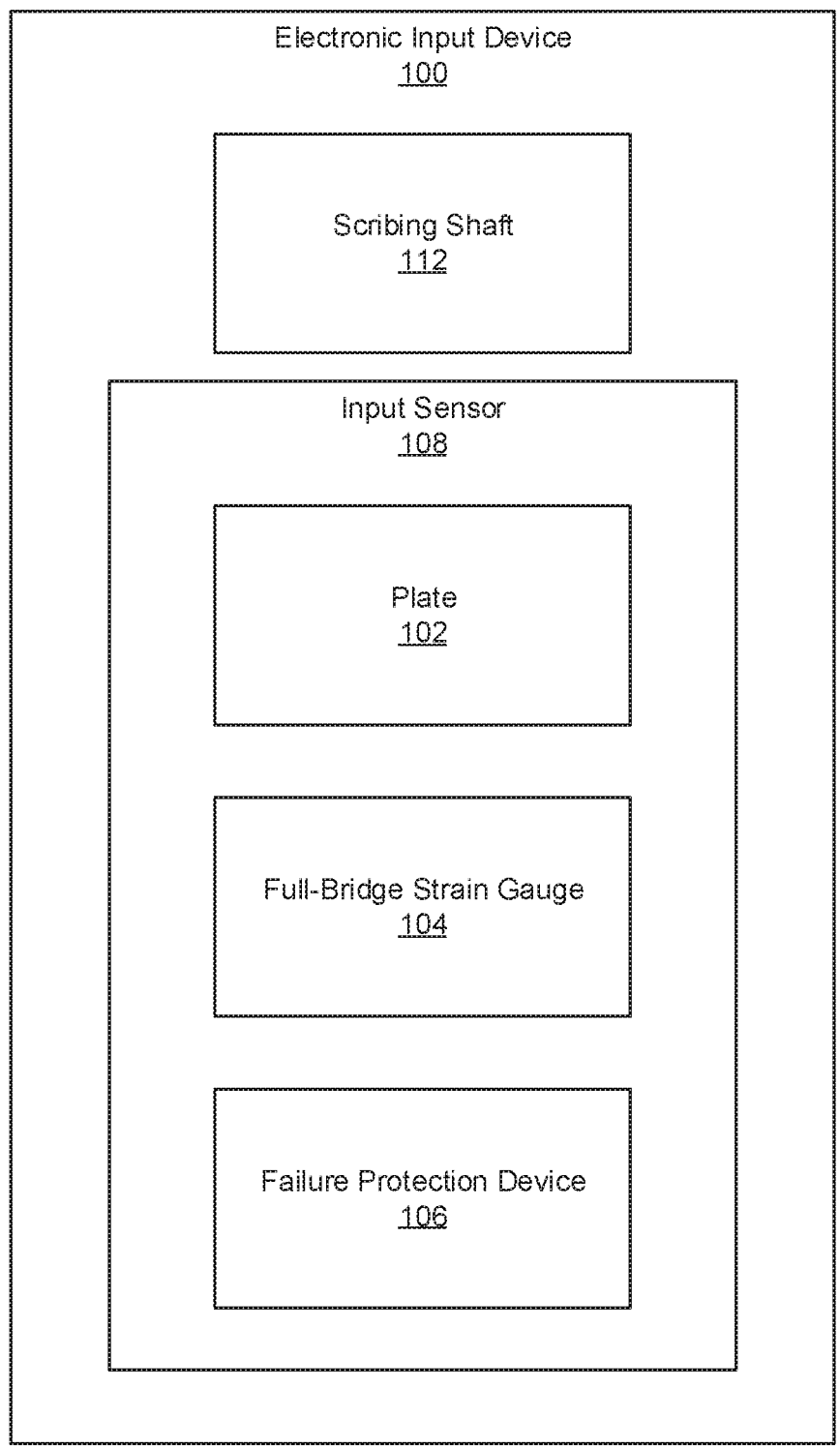
FIG. 1 is a block diagram of an electronic input device with an input sensor having a failure protection device, according to an example of the principles described herein.

Throughout the drawings, identical reference numbers designate similar, but not necessarily identical, elements. The figures are not necessarily to scale; and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Input devices are coupled to electronic devices such as computers; tablets, and other electronic devices. These input devices allow a user to input information to the electronic devices. One example of an input device is an electronic pen. The writing end of the electronic pen includes a tip that can be pressed on a surface, such as a touch-screen display. The input device; or electronic pen can be used with other surfaces as well, such as paper designed to be used with electronic pens. While specific reference is made to a few types of surfaces, any number of surfaces could be implemented in accordance with the principles described herein.

In other words, an electronic pen is an input device which captures the handwriting or brush strokes of a user and converts pen movements into digital data, enabling the movements to be utilized in various applications or rendered directly to a digital display. The surface with which the input device interfaces may be of a variety of types. For example, the surface may be a display screen on an electronic device, which display screen is responsive to touch inputs, such as from a finger or other device such as an electronic pen. In another example, the surface may be a paper surface that is specially-prepared to support electronic inputs. For example, this specially-prepared paper may include features that are imperceptible to the human eye. As the tip passes over these features, it identifies the position of the tip on the specially-prepared paper surface.

The contact force between the tip and the surface can be used to execute operations within an application, such as clicking on buttons/icons within the application. In some examples, the tip is moved across the surface, and a visual representation of the motion is displayed on the touch-screen display, or other surface. In this fashion, the electronic pen can be used to write text, draw images, or interface with an application on the electronic device.

While such electronic pens allow a user to provide input to an electronic device, some characteristics limit their more thorough implementation. For example, such input devices incorporate a sensor to sense a level of pressure being applied by a tip against a scribing surface. The sensed pressure can be used by a corresponding electronic device in a number of ways. For example, it can be used to 1) alter a thickness of the rendered stroke on a display or 2) alter a width of a brush stroke if an input device is being used in a brush mode. Other operations can also be carried out based on output of a pressure sensor. For example, the sensor can determine when the electronic pen transitions from hovering over a scribing surface to actually contacting the scribing surface. In some examples, power management of the electronic pen, i.e., whether the pen is on, in a standby mode, or turned off, is also tied to a tip pressure sensor as well. That is, if no contact is detected, the input pen may be in a standby mode, but turned on once contact is detected, A temporal (time) delay between these transitions in power states may be included in some implementations.

In some examples, such sensors are not sensitive enough to detect slight variations in application force. Thus, a less than satisfactory user experience is delivered which does not accurately replicate a pen on paper environment. That is, in order to render with an electronic pen with the fidelity of a pen on paper, the electronic pen should have high pressure sensitivity, resolution, and be fluid and able to sense forces close to zero.

Moreover, such electronic pens are prone to catastrophic failure. That is, the sensors that are used in such pens are fragile, and if dropped at certain orientations, for example tip down, the sensors can be damaged, rendering the sensor less effective, and in some cases, entirely inoperable.

Accordingly, the present specification describes an input sensor that provides greater sensitivity and that protects the sensor against catastrophic failure as may result when the electronic pen is dropped from a height, such as from a desktop. Specifically, the present specification describes an electronic device input sensor that has a low starting pressure, high resolution and sensitivity, and that includes a mechanism to protect against catastrophic failure of the sensor to due dropping or other failure mechanism.

Specifically, the present specification describes an electronic input device. The electronic input device includes a scribing shaft disposed within a housing to translate along a longitudinal axis as a result of contact with the substrate. The electronic input device also includes an input sensor. The input sensor includes a plate secured within the housing. The plate elastically deforms responsive to the translation of the scribing shaft. A full-bridge strain gauge of the sensor is disposed on a surface of the plate and detects a deformation of the plate. The strain gauge outputs a corresponding signal which varies dependent upon the amount of deformation of the plate. A failure protection device of the electronic device input sensor limits the deformation of the plate to within a predetermined amount.

The present specification also describes an electronic input device. The electronic input device includes a scribing shaft disposed within a housing. The scribing shaft translates along a longitudinal axis as a result of contact with a substrate. The electronic input device also includes an annular housing to retain a sensor. The sensor includes a plate to elastically deform responsive to the translation of the scribing shaft and a full-bridge strain gauge to detect a deformation of the plate and output a corresponding signal. The sensor also includes a shaft holder to 1) hold, and translate with, the scribing shaft and 3) contact the annular housing when a predetermined contact force is reached to limit the deformation of the plate to within a predetermined amount. A plunder of the device presses against, and deforms, the plate responsive to the translation of the scribing shaft. The electronic input device also includes a spring to 1) transmit and dampen the axial force from the scribing shaft to the plate and 2) return the scribing shaft to an initial position in the absence of contact with the substrate.

The present specification also describes an electronic input system. The system includes a housing which includes an opening through which a scribing shaft protrudes. The system also includes the electronic input device at least partially disposed within the housing. The electronic input device includes the scribing shaft and a sensor device. The sensor device includes a sensor disposed within an annular housing. The sensor includes 1) a plate to elastically deform responsive to the translation of the scribing shaft, 2) a full-bridge strain gauge to detect a deformation of the plate and output a corresponding signal. The sensor also includes a shaft holder to 1) hold, and translate with, the scribing shaft and 2) contact the annular housing when a predetermined contact force is reached to limit deformation of the plate to within a predetermined amount, A plunger of the sensor presses against, and deforms, the plate responsive to the translation of the scribing shaft. The sensor also includes at least one spring to 1) transmit and dampen the axial force from the scribing shaft to the plate and 2) return the scribing shaft to an initial position in the absence of contact with the substrate. The electronic input system also includes circuitry to pass an output of the full bridge strain gauge to a controller for executing an operation based on the axial force.

In one example, using such an electronic input device 1) may exhibit enhanced force sensing sensitivity; 2) may be more responsive to differentiations in user input force and direction; 3) may provide a user experience that more closely resembles a pen and paper experience; and 4) may protect the axial sensor from catastrophic failures. However, it is contemplated that the devices disclosed herein may address other matters and deficiencies in a number of technical areas.

As used in the present specification and in the appended claims, the term "electronic pen" refers to an electronic input device that imitates a pen.

Further, as used in the present specification and in the appended claims; the term "scribing shaft" refers to a component of the electronic input device that contacts a surface to generate an output. For example, a user presses the scribing shaft of the electronic input device against a surface such as paper, a digital display; and/or a touch screen display. Doing so causes the scribing shaft to translate longitudinally along an axis of the electronic input device.

Still further, as used in the present specification and in the appended claims, the term "circumferential strain gauge wires" refers to wires of a strain gauge that are formed around a rim of a round strain gauge and where the strain sensing portions of the wires have a radial orientation. That is an orientation from an interior of the round strain gauge towards an edge of the round strain gauge.

Still further, as used in the present specification and in the appended claims; the term "radial strain gauge wires" refer to wires of a strain gauge that are interior to the circumferential wires and where the strain sensing portions of the wire have a circumferential orientation. That is, an orientation where the wires are curved and parallel to the edge of the round strain gauge.

Still further, as used in the present specification and in the appended claims, the term "axial" refers to a force or direction that is collinear with the longitudinal axis of the electronic input device.

Even further, as used in the present specification and in the appended claims, the term "a number of" or similar language is meant to be understood broadly as any positive number including 1 to infinity.

Turning now to the figures, FIG. 1 is a block diagram of an electronic input device (100) with an input sensor (108) having a failure protection device (106), according to an example of the principles described herein. The electronic input device (100) includes a scribing shaft (112) which refers to a component that contacts a surface to generate an output. For example, a user presses the scribing shaft (112) of the electronic input device (100) against a surface such as paper, a digital display, and/or a touch screen display. Doing so causes the scribing shaft (112) to translate longitudinally along an axis of the electronic input device. This axial force is sensed by the input sensor (108).

The input sensor (108) produces an output responsive to the scribing shaft (112) contacting the surface. This axial force is sensed by the input sensor (108) and a number of operations can be carried out based on this output. For example, a line width can be varied, application operations can be executed or initialized, and power to the electronic input device can be provided. In some examples, different functions can be carried out based on a different outputs.

To sense the axial forces, the input sensor (108) includes various components. For example, the input sensor (108) includes a plate (102). The plate (102) may be circular and formed to fit inside a housing of the electronic input device (100). The plate (102) elastically deforms in response to an axial force from the scribing shaft (112) as it translates. That is, contact of the scribing shaft (112) against a surface causes the shaft (112) to translate within the electronic input device (100). This translation is transmitted, either directly or indirectly, to the plate (102) and the plate (102) deforms. However, when the force is removed, i.e., the shaft (112) returns to its initial position and the plate (102) returns to its non-deformed state. In order to deform, the plate (102) may be formed of a thin material.

Such deformation of the plate (102) induces tensile strain and compressive strain in the plate (102). As will be described below, the amount of tensile strain and compressive strain in the plate (102) can be measured and a corresponding output signal generated. The amount of strain is dependent upon a number of factors including a material type and thickness. For example, a thinner plate (102) may deform more and therefore be more sensitive to axial forces, whereas a thicker plate (102) may deform less and therefore be less sensitive to axial forces. The plate (102) may be formed of any number of materials including spring steel or aluminum.

The input sensor (108) also includes a full-bridge strain gauge (104) to detect the deformation, both tensile and compressive, of the plate (102). For example, the resistance of some materials change when strain is applied to them or when they are stretched. That is when force is applied to a metallic wire, its length increases due to the strain. The greater the force applied, the greater the strain, and the greater the increase in a wire's length. For example, if $L_1$ is an initial length of a wire, and $L_2$ is a final length after application of the force, the strain may be modeled as $\varepsilon=(L_1-L_2)/L_1$. As the length of the wire increases its resistance increases. Moreover, as the length of the wire increases, its diameter decreases, which further alters the wire resistivity. This change in resistance of the conductor can be measured and calibrated to an applied force. Thus, the full-bridge strain gauge (104) is used to measure the strain on the plate (102), from which an associated axial force can be determined. The input and output relationship of the strain gauges can be expressed by a gauge factor which is defined as the change in resistance for a given value of applied strain.

In some examples, the full-bridge strain gauge (104) is circular in shape and is disposed on top of the plate (102). As the plate (102) is deformed, wires in the strain gauge (104) are lengthened and thinned such that their resistance changes. This change in resistance can be mapped to the force applied to deform the plate (102) and operations carried out accordingly. That is, the full-bridge strain gauge (104) outputs a signal that corresponds to the deformation, which deformation is defined by the axial force applied to the scribing shaft. The output value of the full-bridge strain gauge (104) varies depending on the deformation of the plate (102) and the corresponding force of the scribing shaft against a surface. That is, different output values correspond to different scribing forces.

In some examples, the full-bridge strain gauge (104) includes strain sensitive wires that are disposed with a material, such as a copper-nickel-manganese alloy, which is then adhered to the plate (102). The adhesive used to join the strain gauge (104) to the plate (102) depends on the intended lifetime of the input sensor (108). For example, in short term measurements up to multiple weeks, a cyanoacrylate glue may be used, but in longer term measurements, an epoxy glue may be used. In another example, the wires that form the full-bridge strain gauge (104) are printed directly onto the plate (102).

The input sensor (108) also includes a failure protection device (106) to limit the deformation of the plate (102) to within a predetermined amount. That is, the plate (102), being thin to deform resultant from a scribing pressure, can also permanently deform if the axial force is great enough. For example, if the electronic input device (100) were dropped such that the scribing shaft (112) tip contacts the ground with great force, the scribing shaft (112), without such a failure protection device (106) could press against the plate (102) with such force so as to permanently deform, or otherwise rupture, the plate (102). Doing so would obviously impede the performance of the input sensor (108), and in some cases, render the input sensor (108) inoperable. The failure protection device (106) operates to prevent such impactful contact thus preserving the plate (102).

The failure protection device (106) also preserves the full-bridge strain gauge (104). That is, the full-bridge strain gauge (104) may have delicate circuitry disposed on a delicate substrate such that too great a force can impact its operation. Accordingly, the failure protection device (106) prevents unrestrained deformation of the plate (102) and full-bridge strain gauge (104) thus improving their performance and longevity.

The electronic device input sensor (108) of the present specification, by having a highly sensitive full-bridge strain gauge (104) may be able to detect axial forces of less than 2.0 grams. Moreover, using the failure protection device (106), the useful life of the electronic device input sensor (108) and the corresponding electronic input device may be enhanced.

Figure 2A:
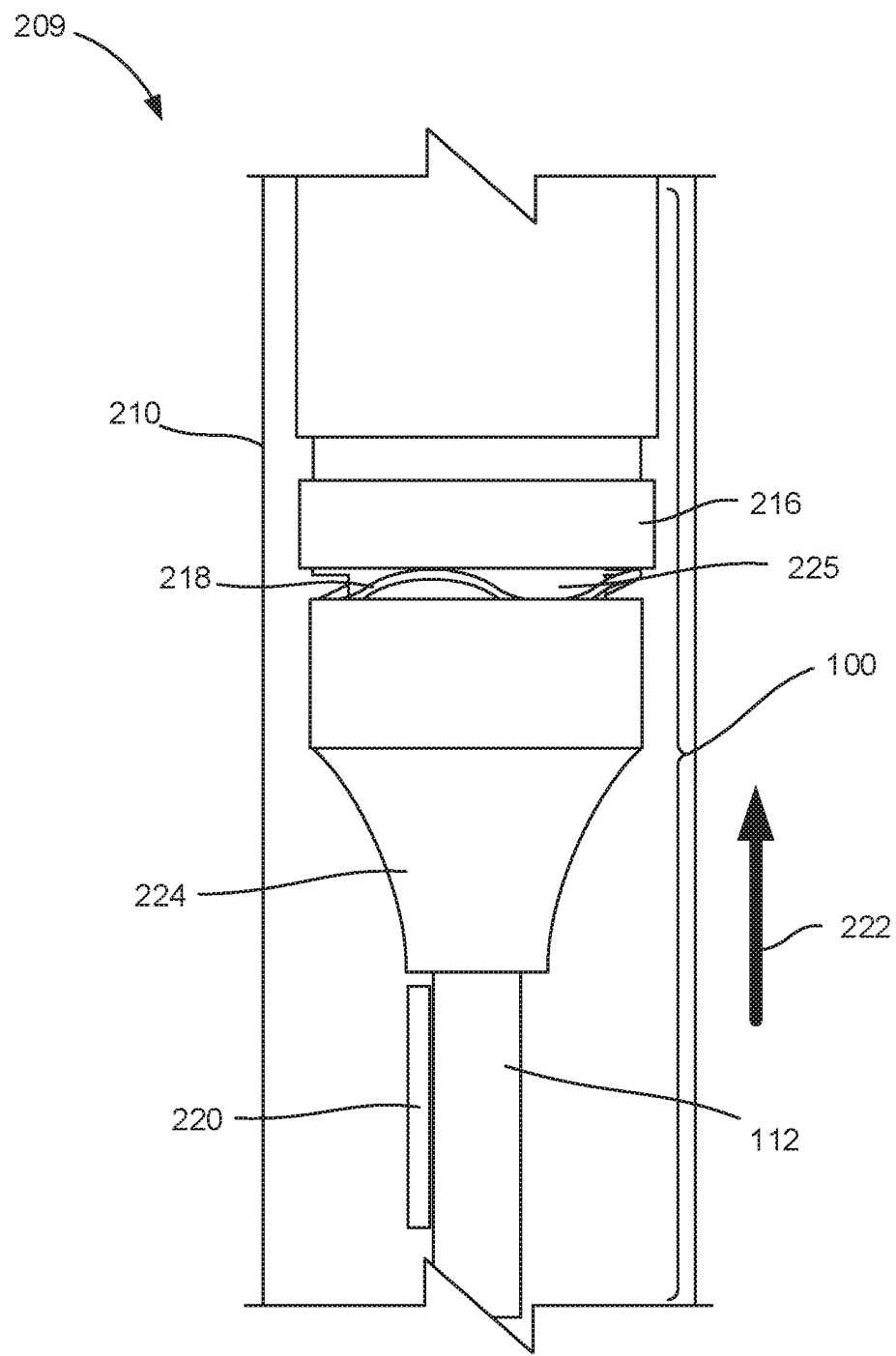
FIGS. 2A-2C are diagrams of an electronic input system with an electronic input device sensor with a failure protection device, according to an example of the principles described herein.
Figure 2B:
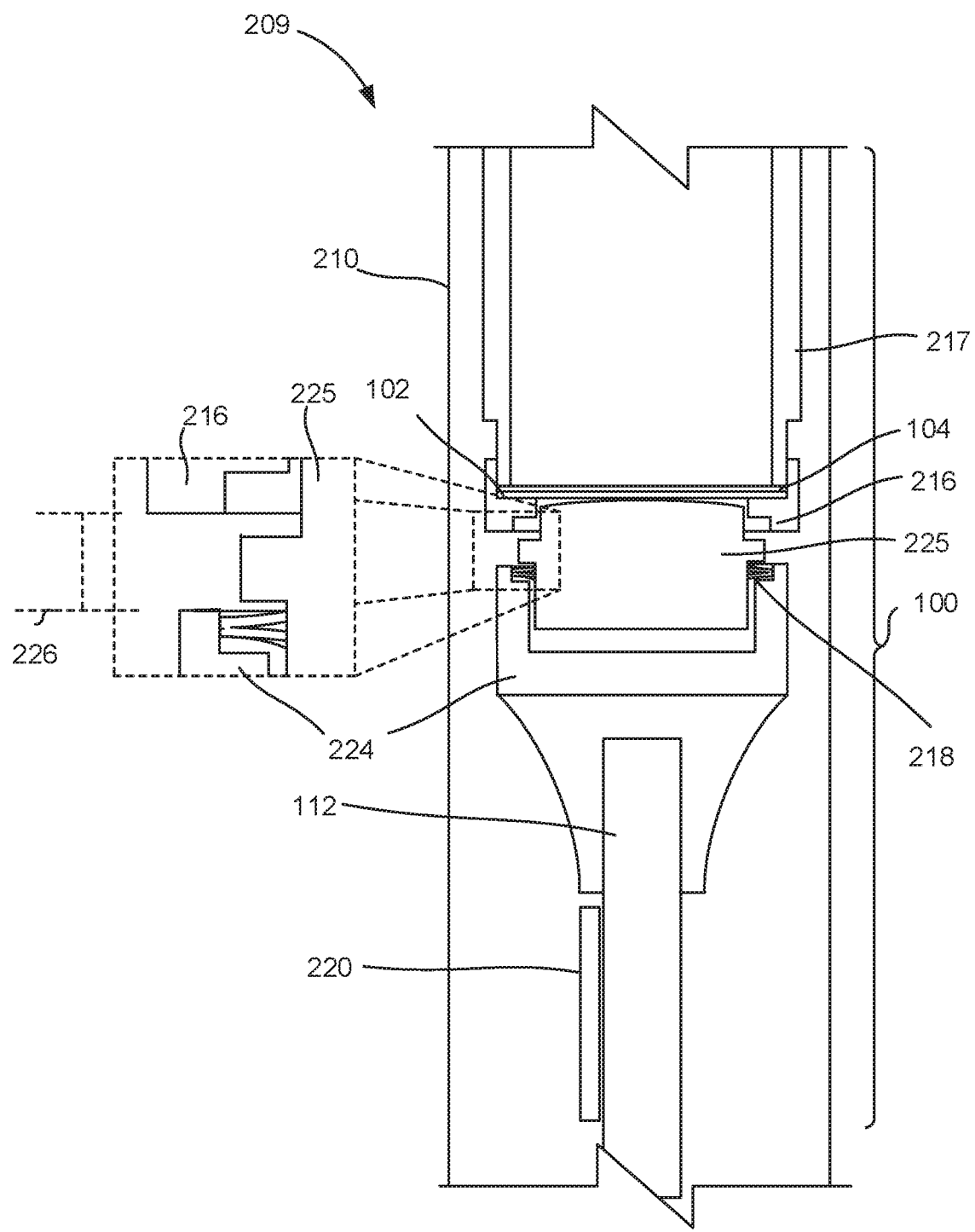
Figure 2C:
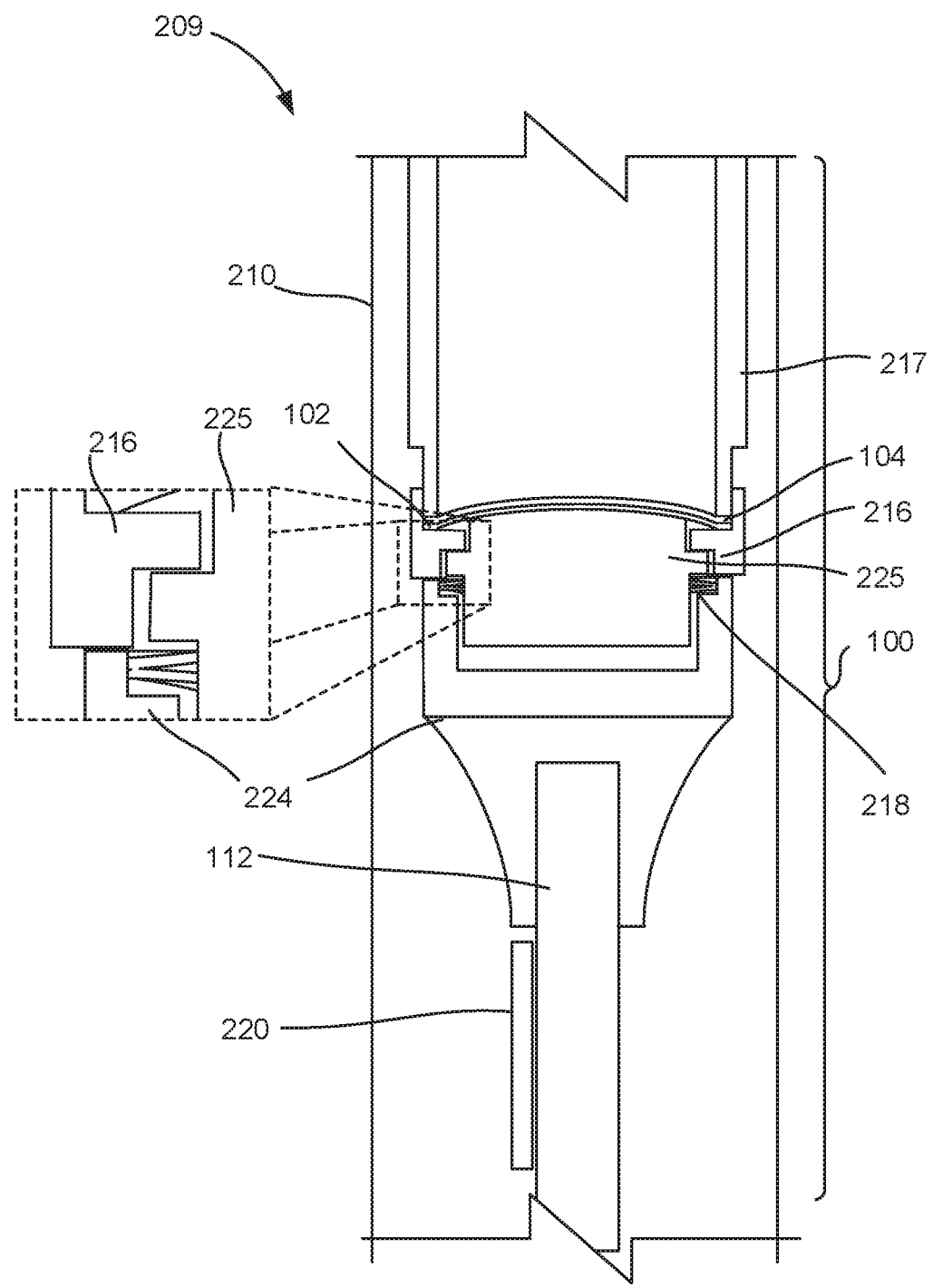

FIGS. 2A-2O are diagrams of an electronic input system (209) with an electronic input device (FIG. 1, 100) having an electronic device input sensor (FIG. 1, 108) with a failure protection device (FIG. 1, 106), according to an example of the principles described herein. Specifically, FIG. 2A is a view of a portion of the electronic input system (209) with a housing (110) cut away to expose the electronic input device (100) at least partially disposed within. FIG. 2B is a cross-sectional diagram of the electronic input system (209) in a non-contact state, and FIG. 2C is a cross-sectional diagram of the electronic input system (209) in a contacted state with the failure protection device (FIG. 1, 106) engaged to prevent catastrophic failure. In the present specification and in the appended claims, the electronic input system (209) refers to the electronic input device (100) along with the housing (210) in which the electronic input device is inserted.

As depicted in FIG. 2A, the electronic input system (209) includes an external housing (210). The external housing (210) holds the other components of the electronic input system (209) including the electronic input device (100). The housing (110) includes an opening through which the scribing shaft (112) protrudes.

The external housing (210) also provides a surface which a user can grasp to manipulate the electronic input device (100). In some examples, the external housing (210) has a rubber sleeve, or other ergonomic feature, disposed along at least a portion of its length to provide a grip. The grip provides a greater friction force such that a user can grasp the external housing (210) and more easily manipulate the electronic input device (100) to interact with the surface. The external housing (210) may be formed of any material such as plastic or metal.

The electronic input system (209) also includes an electronic input device (100) which is disposed, at least partially, within the external housing (210). For example, a tip of the scribing shaft (112) may protrude through the opening of the housing (210), but other components may be inside the housing (210).

The electronic input device (100) includes various components to facilitate interaction with a surface such as a touch-screen display or the above-described specially-prepared paper. For example, the electronic input device (100) includes the scribing shaft (112) with a tip that interfaces with the surface.

The electronic input device (100) may also include a sensor device to detect axial movement of the scribing shaft (112). That is, as the scribing shaft (112) contacts a surface, it translates in a direction indicate by the arrow (222). This translation is sensed by the sensor device and converted into a signal that is an input to a computing device to execute various operations.

The sensor device includes an annular housing (216).

The sensor device also includes an input sensor (FIG. 1, 108). The input sensor (FIG. 1, 108) in some examples includes a shaft holder (224) to hold the scribing shaft (112) and translate, at least partially, a force therefrom to the plate (FIG. 1, 102). For example, the shaft holder (224) may move a plunger (225) that presses against, and deforms, the plate (FIG. 1, 102) responsive to the translation of the scribing shaft (112). The shaft holder (224), in some examples, also forms part of the failure protection device (FIG. 1, 106). Specifically, as described below in at least FIGS. 2B and 2C, the shaft holder (224) contacts the annular housing (216) when a predetermined contact force is reached to limit the deformation of the plate (FIG. 1, 102) to within a predetermined amount. Accordingly, the spacing between the annular sensor housing (216) and the shaft holder (224) and a spring constant of the spring (218) are selected to allow force detection, but to prevent permanent deformation of the plate (102).

The electronic input device (100) also includes at least one spring (218). The spring (218) is biased against the translation of the scribing shaft (112) such that it dampens, at least in part, the axial force in the direction of the arrow (222) and returns the scribing shaft (112) to a non-contact position in the absence of a contact force of the scribing shaft (112) against the surface. In some examples, as depicted in FIG. 2A, the spring (218) is a compression spring, such as a wave spring, that resists compression and is initially in contact with both the plunger (224) and the annular housing (216).

The electronic input system (209) also includes circuitry (220). The circuitry (220) includes hardware, such as processors and memory, to receive an output signal of the sensor device, and passes this output signal to a controller, where different computing operations can be carried out based on the output signal. For example, based on the output signal, line widths can be adjusted, computing applications executed, operations within applications executed, and an initialization of the electronic input device (100).

FIG. 2B is a cross-sectional diagram of the electronic input system (209) with the electronic input device (100) in a non-contacted state. FIG. 2B clearly depicts the shaft holder (224) as it presses the plunger (225) via the spring (218) against the plate (102). In this example, as there is no contact force, the plate (102) nor the full-bridge strain gauge (104) are deformed. In this example, the failure protection device (FIG. 1, 106) includes 1) the shaft holder (224) which holds, and translates with, the scribing shaft (112), 2) the plunger (225), and 3) the annular housing (216) which holds the plate (102) and the full-bridge strain gauge (104). In this example, as the threshold translation, and the threshold contact force, have not yet been reached, there is a gap (226) between the shaft holder (224) and the annular housing (216). Note that in some examples, the plunger (225) has a curved contact surface with the plate (102). Doing so reduces the contact stress on the plate (102) and may prolong the life of the sensing system.

FIG. 2B also depicts that the plate (102) and full-bridge strain gauge (104) are circumferentially supported within the housing (210). That is, they are supported on bottom by the annular housing (216) and supported on top by a cap (217) to keep them in place. Being supported on both sides as indicated, the plate (102) and full-bridge strain gauge (104) may deflect uniformly throughout their entire respective surfaces.

FIG. 2C is a cross-sectional diagram of the electronic input system (209) with the electronic input device (100) in a contacted state. That is, in this example; the scribing shaft (112) has translated responsive to a contact force between the scribing shaft (112) and a surface. This translation compresses the spring (218) to resist the contact force thus dampening the contact force. The translation also causes the plunger (225) to deform the plate (102) and the full-bridge strain gauge (104). Such deformation results in a lengthening and thinning of the wires that make up the full-bridge strain gauge (104), thus changing their resistivity. These changes in resistivity generate an output signal, which is passed to the circuitry (220) for off boarding to control a computing device.

FIG. 2C also depicts the operation of the failure prevention device (FIG. 1, 106) which, in this example includes the annular housing (216) and the shaft holder (224). As compared to FIG. 2B, in this example the scribing shaft (112) and shaft holder (224) have been displaced enough such that the shaft holder (224) contacts the annular housing (216) thus preventing further translation of the scribing shaft (112) and further deformation of the plate (102) and full-bridge strain gauge (104). Accordingly, permanent deformation of the plate (102) and strain gauge (104) are prevented. The degree to which the plate (102) is allowed to deform is based on a number of factors including the distance between the annular housing (216) and the shaft holder (224) as well as the spring constant of the spring (218). Such factors may vary across different input devices (100) based on applications and uses.

Figure 3A:
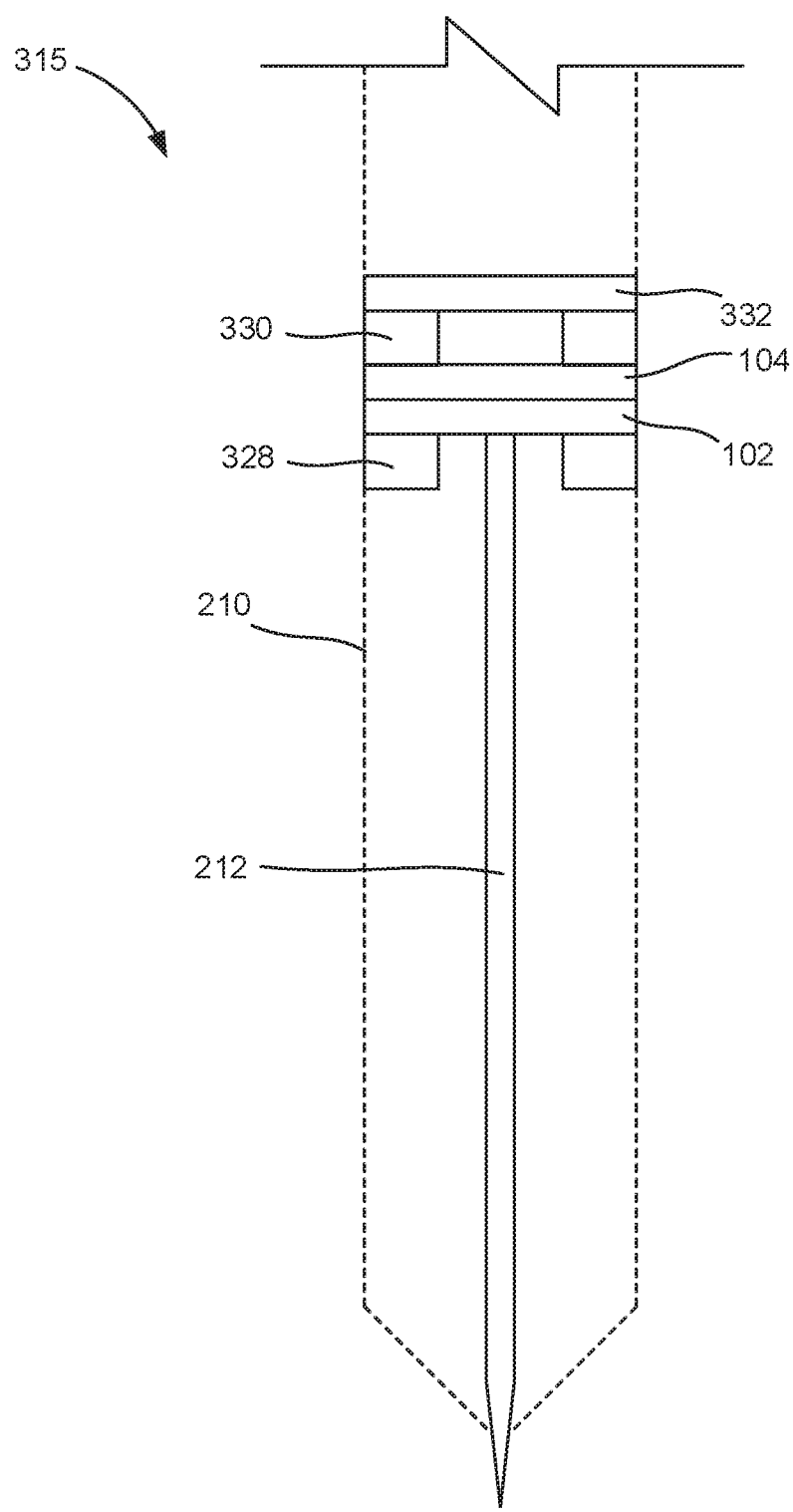
FIG. 3A-3C are diagrams of an electronic input device with an input sensor with a failure protection device, according to an example of the principles described herein.
Figure 3B:
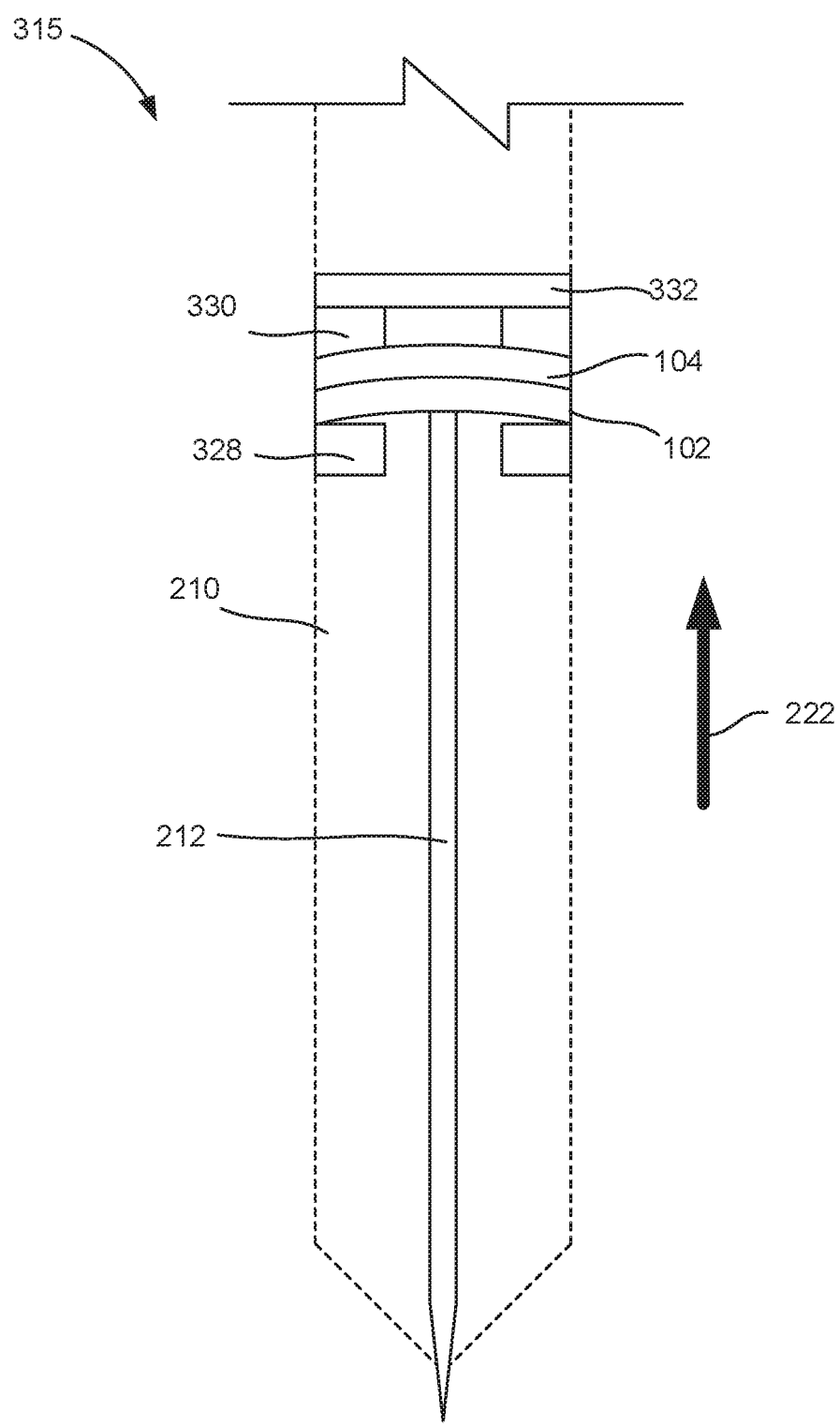
Figure 3C:
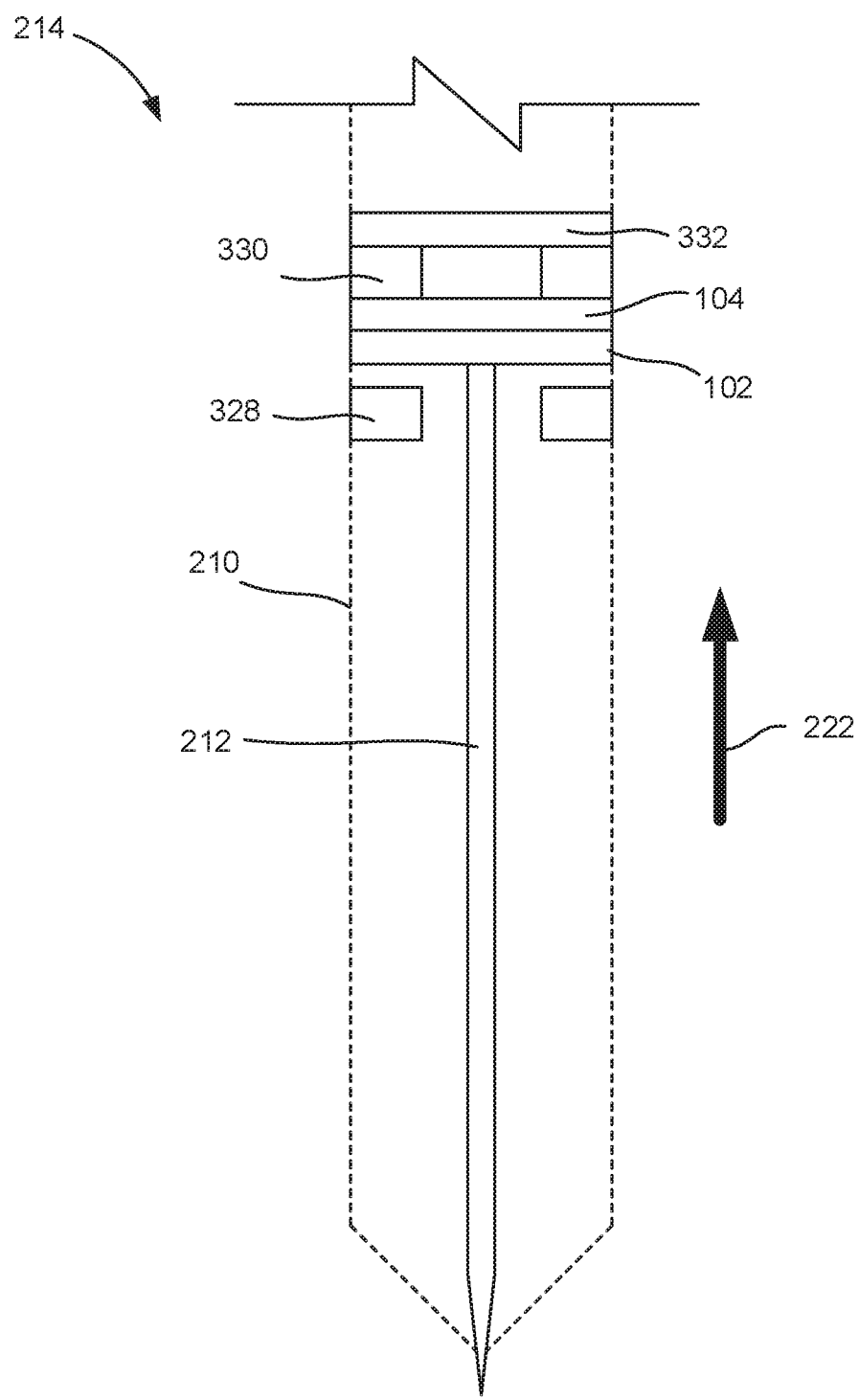

FIG. 3A-3C are diagrams of an electronic input device (315) with an input sensor (FIG. 1, 108) with a failure protection device (FIG. 1, 106), according to an example of the principles described herein. Specifically, FIG. 3A is a cross-sectional diagram of the electronic input device (315) in a non-contact state, FIG. 3B is a cross-sectional diagram of the electronic input device (315) in a contacted state, and FIG. 3C is a cross-sectional diagram of the electronic input device (315) with the failure protection device (FIG. 1, 106) engaged. Note that for reference, FIGS. 3A-30 depict the housing (210) of the electronic input system (FIG. 2, 209) in ghost.

As described above, the housing (210) has an opening through which a tip of the scribing shaft (112) protrudes. The tip of the scribing shaft (112) being the part of the scribing shaft (112) that interfaces with the surface. That is, a user grasps the housing (210) and brings the tip into contact with a surface. As the tip moves across the surface, a visual representation is made on a display (e.g., the surface) that corresponds to the movement of the tip. In some examples, contact of the tip with the surface causes a function to execute on an electronic device to which the surface is coupled. For example, a user may tap on a certain portion of the surface with the tip to position a cursor on that portion of the surface. In another example, a user may tap on an icon on the surface, and an operation may be executed on the electronic device. In some examples, the scribing shaft (112) may be formed of metal and the tip. In other examples, the tip may be formed of another material, such as rubber. In still other examples, the tip may be formed of a composite material.

In some examples, the scribing shaft (112) is removable from the external housing (210). For example, over time and with use, the tip may wear down. In another example, the tip may break off. In these and other examples, the removable scribing shaft (112) with a worn down, or otherwise damaged tip, can be removed and replaced with another scribing shaft (112).

FIGS. 3A-3O also depict the plate (102) and full-bridge strain gauge (104). However, FIGS. 3A-3O and others, certain elements, for example the plate (102) and full-bridge strain gauge (104) are not drawn to scale and have been enlarged for simplicity.

FIGS. 3A-3O also depict the electronic input device (315) with another example of a failure protection device (FIG. 1, 106). In this example, the failure protection device (FIG. 1, 106) includes a magnetic ring (328) on a first side of the plate (102) to hold the plate (102) in place against the axial force. In this example, the failure protection device (FIG. 1, 106) also includes a foam ring (330) on a second side of the plate (102) and more particularly on a second side of the strain gauge (104). The foam ring (330) catches the plate (102) and strain gauge (104) when a magnetic force of the magnetic ring (328) is overcome by the axial force and to return the plate (102) to contact the magnetic ring (328) once the catastrophic over-load axial force is no longer present. The foam ring (330) will allow the scribing shaft (112) to recede into the body of the pen protecting the plate (102), strain gauge (104), and pen tip from catastrophic failure. The failure protection device (FIG. 1, 106) also includes a stop plate (332) against which the foam ring (330) compresses. As depicted in FIG. 3A, when no axial force is present, the scribing shaft (112) contacts the plate (102), but does not deform it.

In FIG. 3B, the scribing shaft (112) is pressed against a surface such that the scribing shaft (112) translates in the direction indicated by the arrow (222). In this example, the magnetic force of the magnetic ring (328) is strong enough to retain the plate (102) and full-bridge strain gauge (104) while allowing each to deform. Such deformation is captured by the strain gauge (104) and output to circuitry (FIG. 2, 220) to execute a particular operation. In this example, the deformation of the plate (102) and strain gauge (104) may cause the foam ring (330) to compress against the stop plate (332). As such, the foam ring (330) may be formed of a material that rebounds slowly when compressed, which may result in a contour of the foam ring (330) against the plate (102)/strain gauge (104). An example of such a material is a cellular urethane form.

In FIG. 3C, a force to overcome the magnetic force of the magnetic ring (328) is applied. Such a force may result in a catastrophic failure. For example, when the electronic input device (315) is dropped and the scribing shaft (112) strikes a surface. In this example, the force pushes the plate (102) and strain gauge (104) away from the magnetic ring (328). As they are no longer coupled to the magnetic ring (328), they return to their original shape, i.e., they are no longer deformed. Accordingly, a magnetic ring (328) may be selected which has a desired magnetic force corresponding to a desired deformation. For example, a magnetic ring (328) with a lower magnetic force will be overcome with a lesser axial force (222) as compared to a magnetic ring (328) with a greater magnetic force. Accordingly, a magnetic ring (328) may be selected based on a desired deformation of the plate (102) and/or an elastic limit of the plate (102) material.

When the force that caused the decoupling of the magnetic ring (328) from the plate (102) is removed, the foam ring (330) will return to its original shape when not compressed. Accordingly, the plate (102)/strain gauge (104) is returned to its position against the magnetic ring (328), Accordingly, the present example allows for deformation of the plate (102) up to a predetermined amount, which predetermined amount is defined based on the magnetic force of the magnetic ring (328). After this point is reached, the plate (102) is pressed into the foam ring (330) and then returned to its position against the magnetic ring (328) once the force dissipates.

Figure 4A:
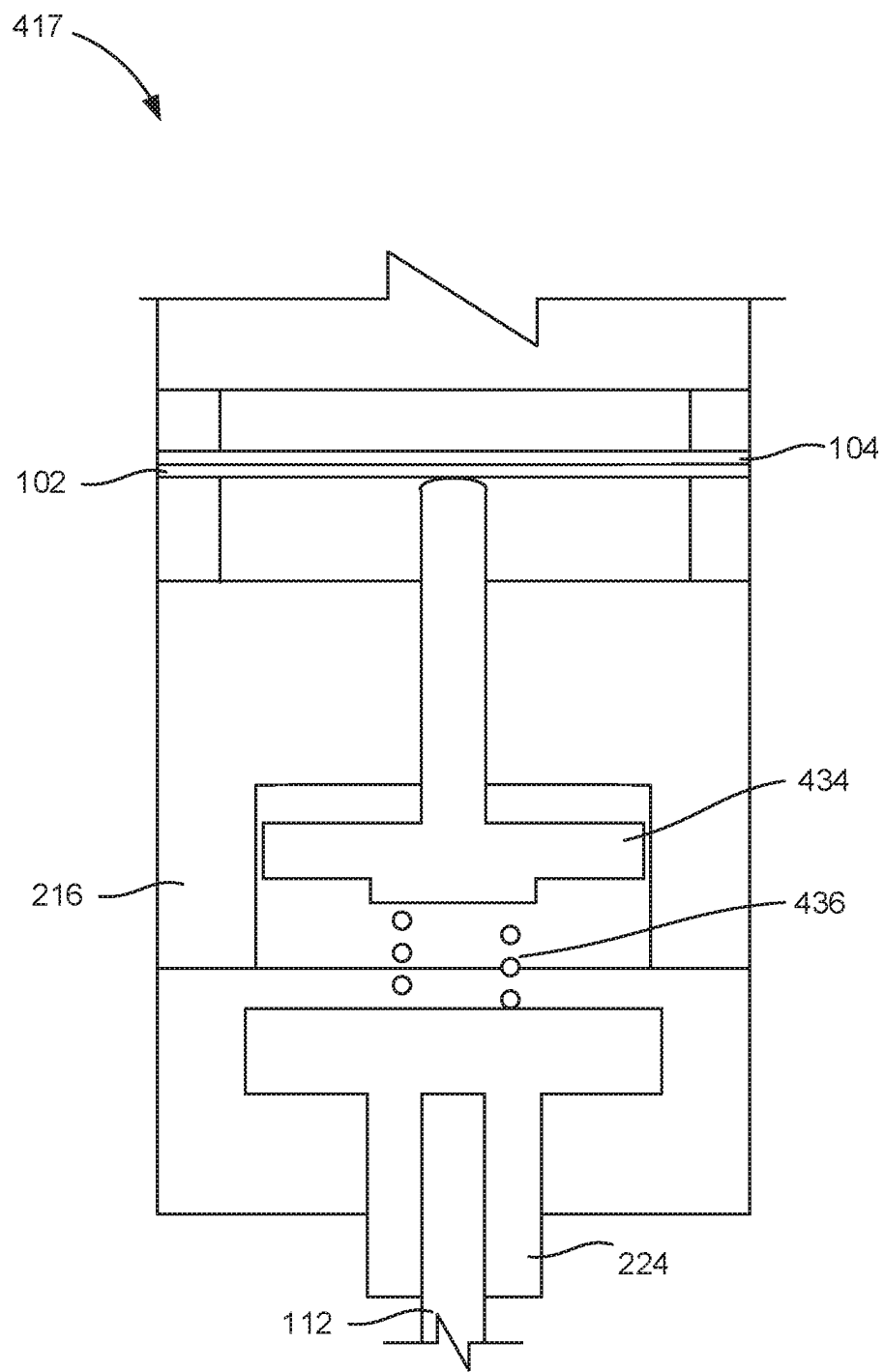
FIG. 4A-4D are diagrams of an electronic input device with an input sensor with a failure protection device, according to an example of the principles described herein.
Figure 4B:
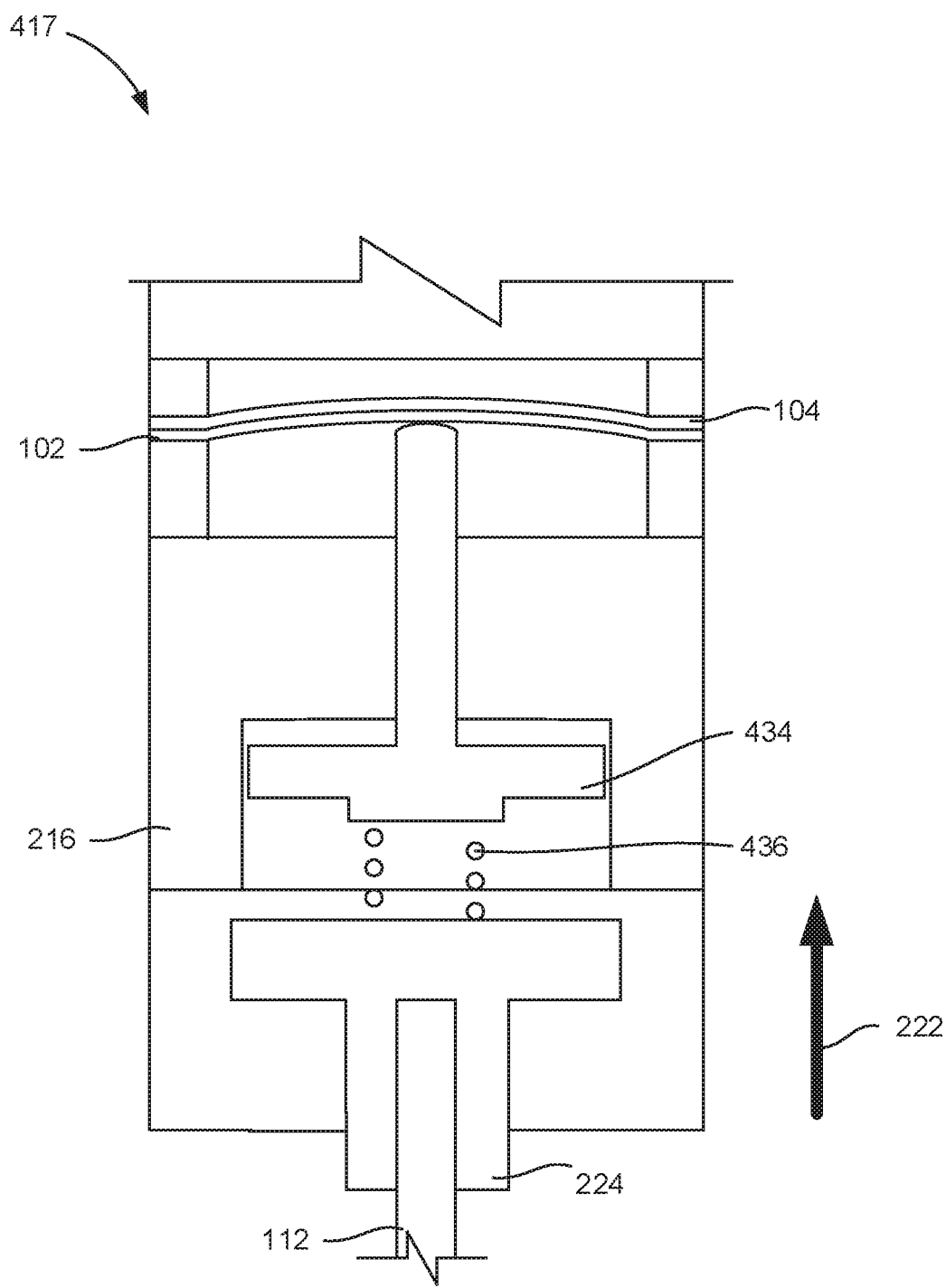
Figure 4C:
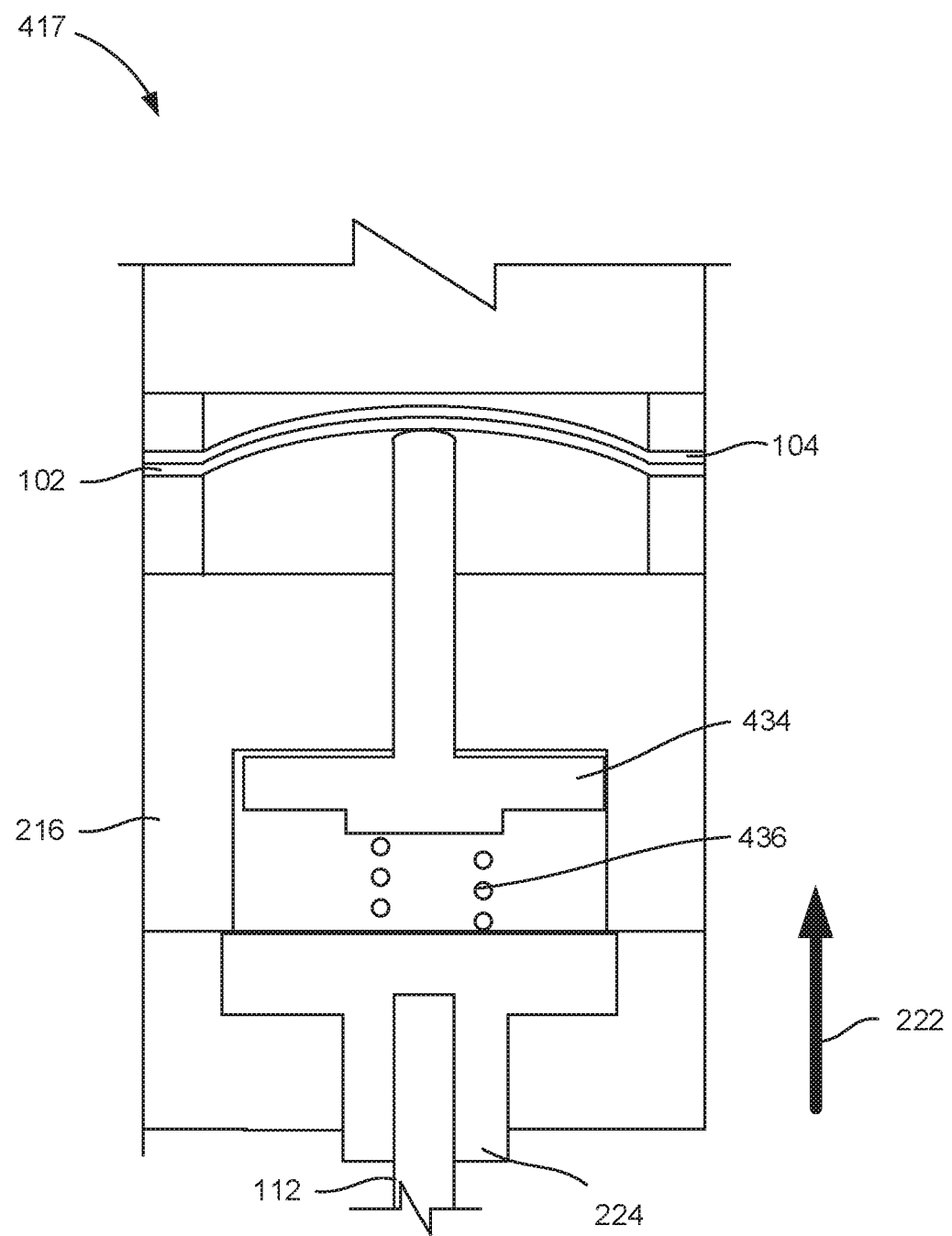
Figure 4D:
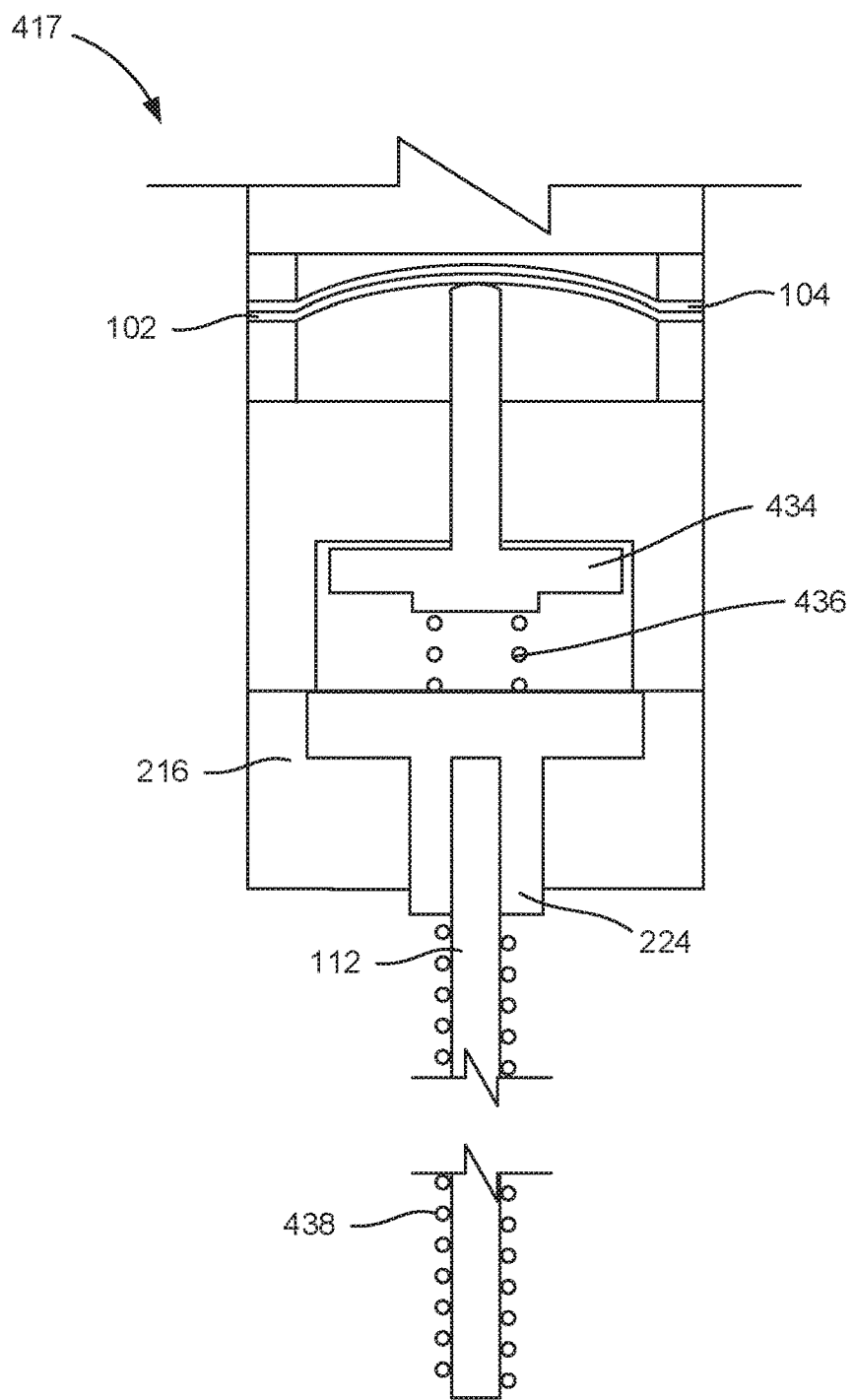

FIG. 4A-4D are diagrams of an electronic input device (417) with an electronic device input sensor (FIG. 1, 108) with a failure protection device (FIG. 1, 106), according to an example of the principles described herein, Specifically, FIG. 4A is a cross-sectional diagram of the electronic input device (417) in a non-contact state, FIG. 4B is a cross-sectional diagram of the electronic input device (417) in a contacted state but not catastrophic contact, FIG. 4C is a cross-sectional diagram of the electronic input device (417) in a contacted state with the failure protection device (FIG. 1, 106) engaged, and FIG. 4D is a cross-sectional diagram of the electronic input device (417) with a shaft spring.

Specifically, FIG. 4A is a cross-sectional diagram of a portion of the electronic input device (417) specifically depicting the scribing shaft (112), the shaft holder (224), the annular housing (216), the plate (102), and the strain gauge (104) prior to contact between the scribing shaft (112) and a contact surface. In this example, sensor device also includes a rod (434) that interfaces with the plate (102) and a compression spring (436) that at least in part, dampens the axial force. That is, as a force is applied, the compression spring (436) dampens the force. In this way, based on the spring constant of the compression spring (436) a desired force-to-deformation relationship can be defined.

FIG. 4B depicts the electronic input device (417) as a contact is made between the scribing shaft (112) tip and a surface. This contact causes the scribing shaft (112) and shaft holder (224), as well as the compression spring (436) and rod (434) to translate in the direction indicated by the arrow (222). This translation causes the rod (434) to contact, and deform, the plate (102) and full-bridge strain gauge (104).

FIG. 4C depicts the electronic input device (417) as a contact is made between the scribing shaft (112) tip and a surface which could otherwise result in catastrophic failure. In this example, contact between the shaft holder (224) and the annular housing (216) prevents additional translation of the scribing shaft (112) and thereby also prevents additional deformation of the plate (102) and strain gauge (104), which additional deformation may be sufficient enough to result in permanent deformation of the plate (102) and/or damage to the full-bridge strain gauge (104).

FIG. 4D depicts another example of the electronic input device (417) that includes a shaft spring (438). In this example, the weight of the sensor device may reduce the sensitivity of the sensor device. Accordingly, a shaft spring (438) may be placed at a base of the shaft holder (224) along a length of the scribing shaft (112) to push up on the sensor device with a force equal to the device's gravitational force thus ensuring that any applied force experienced at the tip is transmitted to the sensor.

Figure 5A:
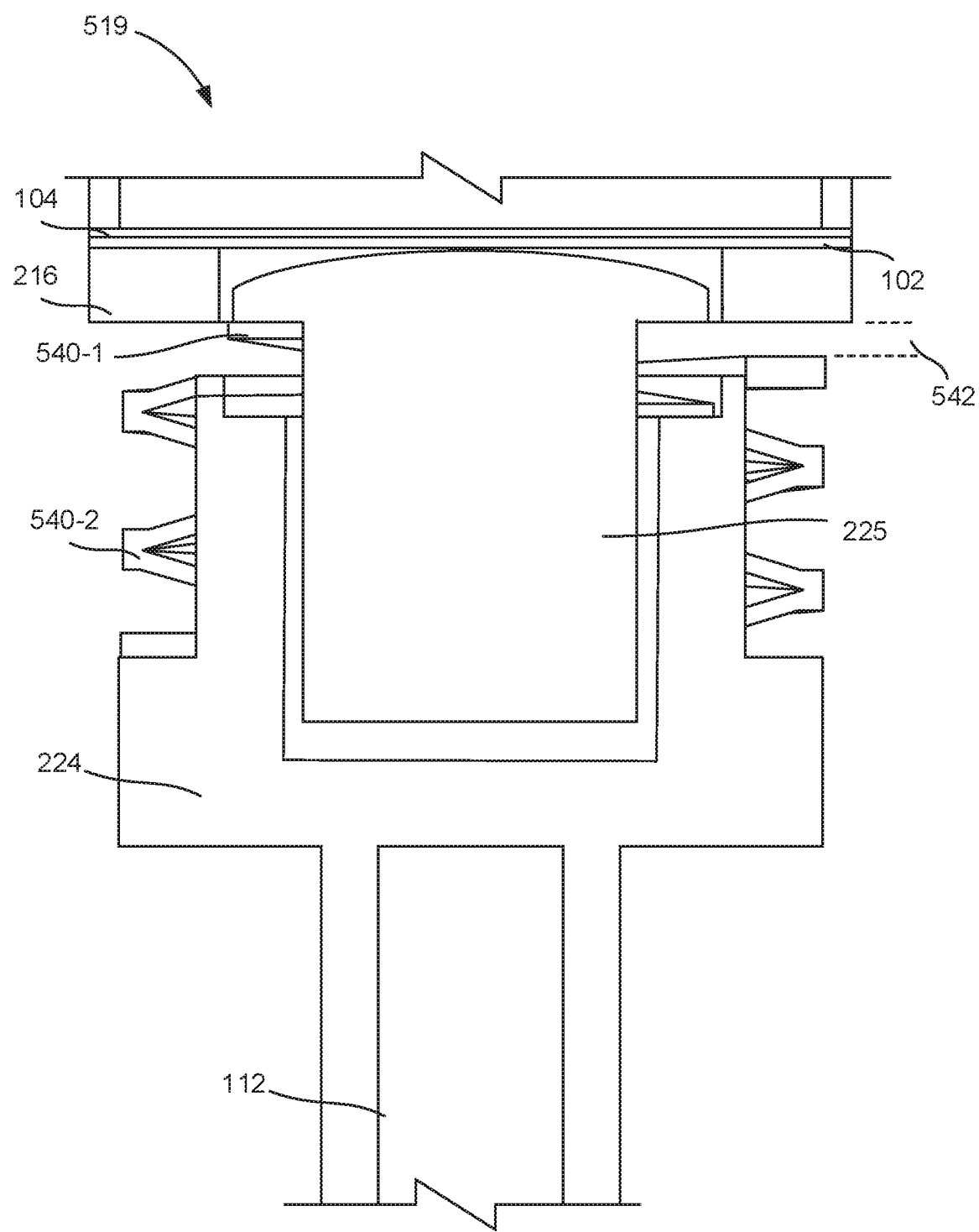
FIG. 5A-5C are diagrams of an electronic input device with an electronic sensor with a failure protection device, according to an example of the principles described herein.
Figure 5B:
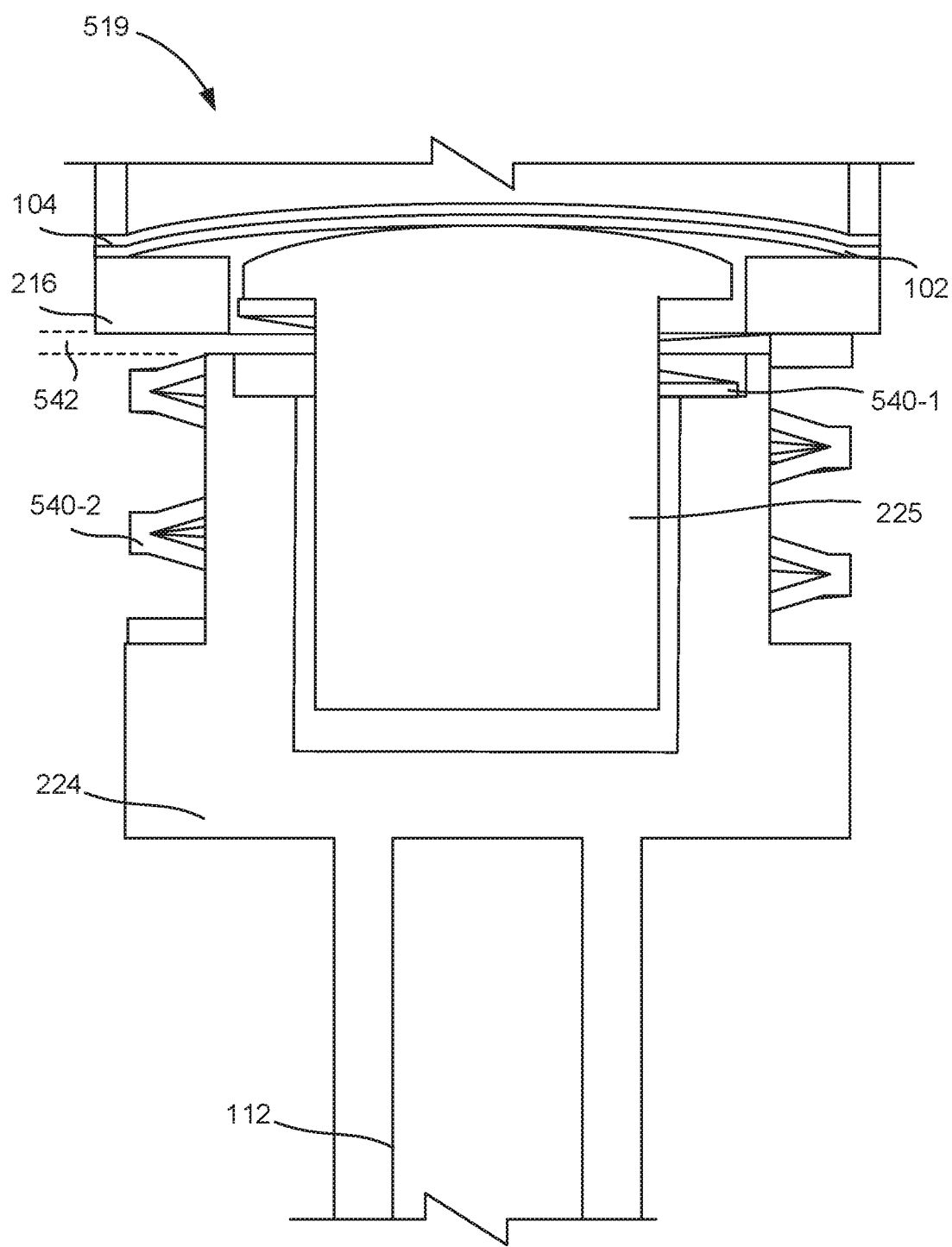
Figure 5C:
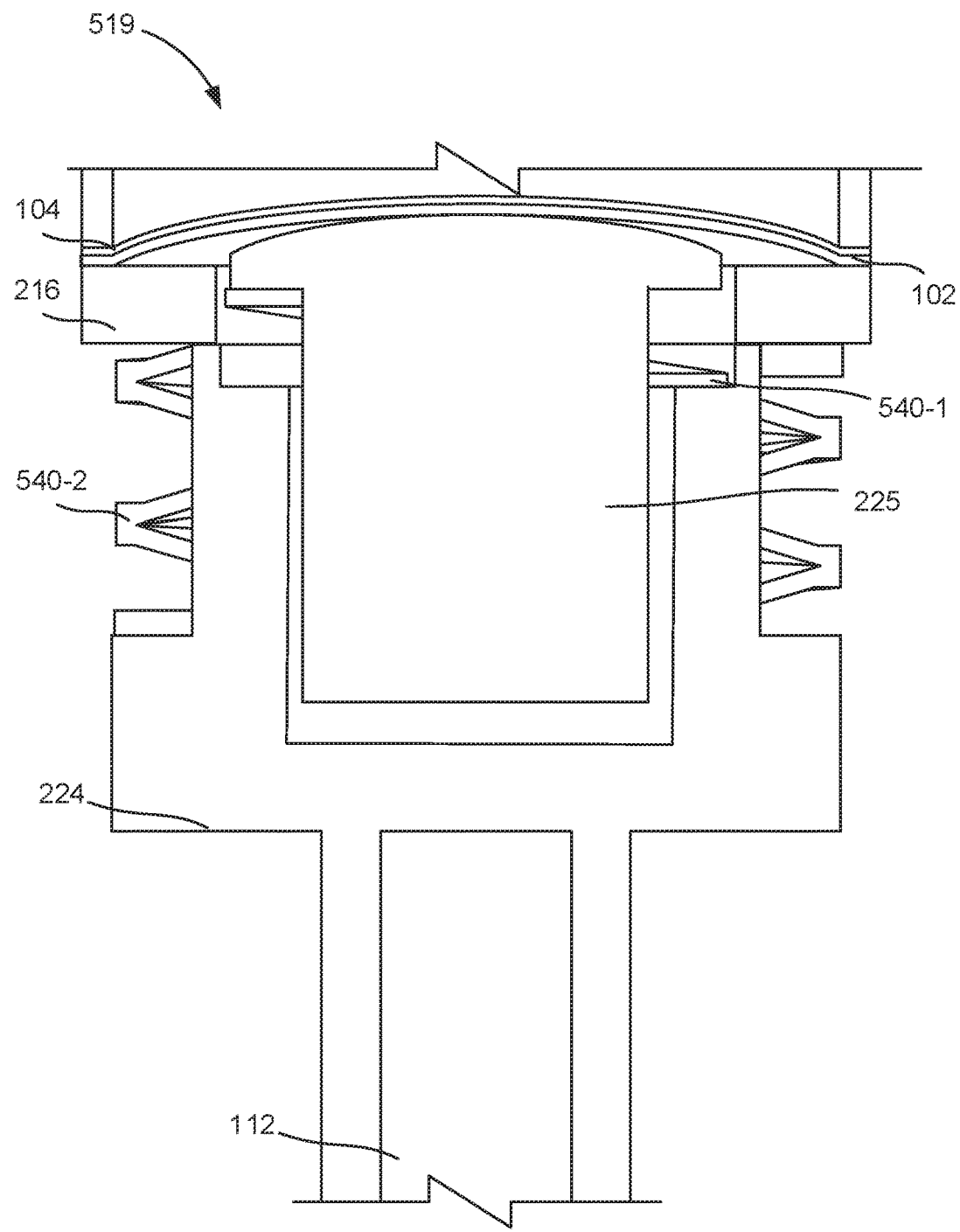

FIG. 5A-5C are diagrams of an electronic input device (519) with an electronic input sensor (FIG. 1, 108) with a failure protection device (FIG. 1, 106), according to an example of the principles described herein. Specifically, FIGS. 5A-5C depict a sensor with multiple springs (540). In this example, the electronic input device (519) may include the scribing shaft (112), shaft holder (224), plunger (225), annular housing (216), plate (102), and strain gauge (104). In this example, a dual-spring (540-1, 540-2) design is used to result in multiple force/deformation relationships. Specifically, for initial forces, which may be lighter, a first spring (540-1) absorbs the entire force before the second spring (540-2) engages. That is, at rest, the first spring (540-1) is in contact with the shaft holder (224) and the annular housing (216) while there is a gap (542) between the second spring (540-2) and the annular housing (216) while the second spring (540-2) is in contact with the shaft holder (224). In other words, these springs (540-1, 540-2) operate sequentially to dampen the force of the plunger (224) against the plate (102)/strain gauge (104) interface. In this example, the first spring (540-1) and the second spring (540-2) may have different spring constants such that different scribing shaft (112) translation to plate (102) deformation relationships exist. For example, the first spring (540-1) may have a lighter spring constant such that it is more sensitive and provides a higher resolution at lower forces. By comparison, the second spring (540-2) may be stiffer such that it is less sensitive and provides a lower resolution at higher forces, FIG. 5B depicts the electronic input device (519) with the first spring (540-1) compressed such that there is no longer a gap between the second spring (540-2) and the annular housing (216). In this example, the second spring (540-2) is now engaged. In this example, there is still available deformation due to a continued gap (542) between the annular housing (216) and the shaft holder (224).

FIG. 5C depicts the electronic input device (519) in a contacted state with the failure protection device (FIG. 1, 106) engaged. That is, the shaft holder (224) is contacting the annular housing (216) such that the scribing shaft (112) can no longer translate, and the plate (102) can no longer deform. Accordingly, such a system prevents over-strain/deflection of the plate (102) thus preserving its life while also allowing deflection such that accurate, sensitive, and high-resolution information can be gathered related to axial translation and contact forces of an electronic pen scribing shaft (112) against a contact surface.

Figure 6:
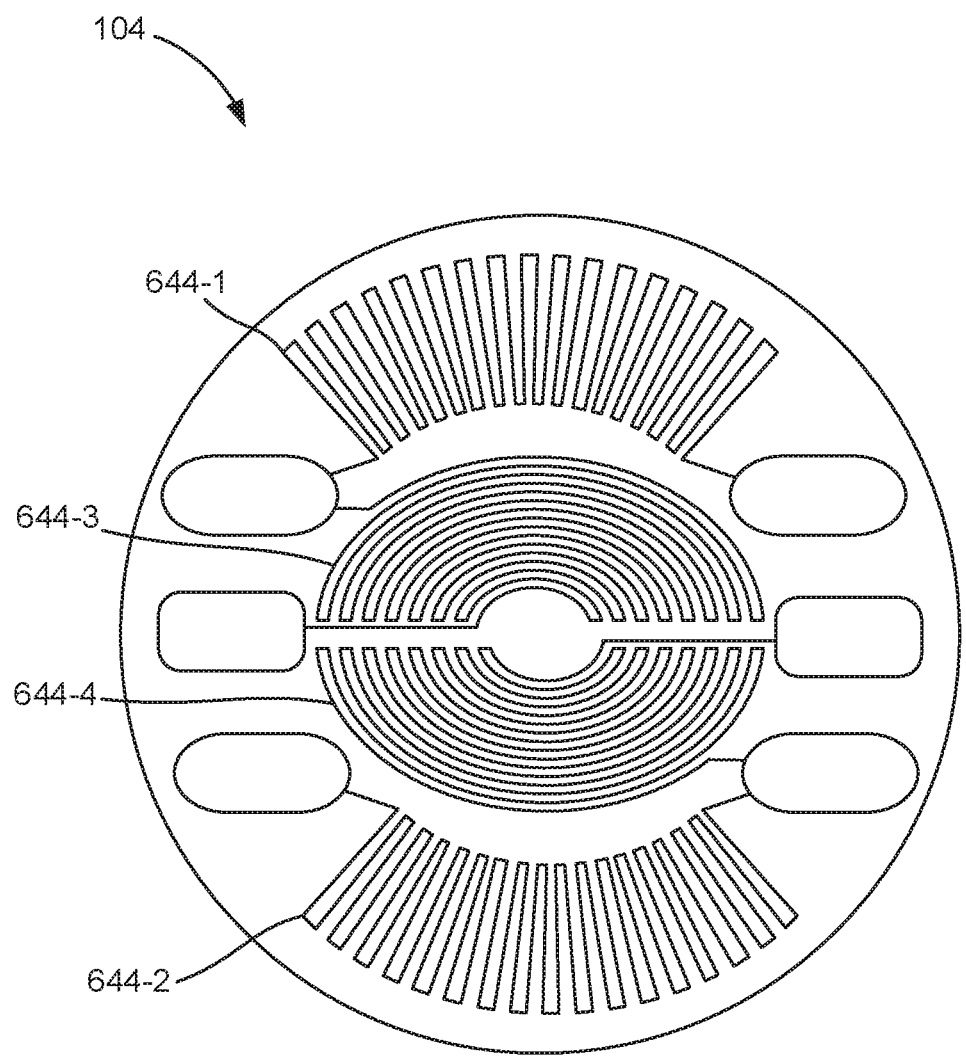
FIG. 6 is a diagram of a full-bridge strain gauge for use in an electronic input sensor with a failure protection device; according to an example of the principles described herein.

FIG. 6 is a diagram of a full-bridge strain gauge (104) for use in an electronic device input sensor (FIG. 1, 108) with a failure protection device (FIG. 1, 106), according to an example of the principles described herein. As described above, a strain gauge (104) is a hardware component that detects changes in strain and converts such detection into an output resistance. That is, resistivity changes based on strain induced. In one example, the full-bridge strain gauge (104) of the present specification is circular in shape to fit in the housing (FIG. 2, 210) of the electronic input device (FIG. 1, 100). The full-bridge strain gauge (104) includes two circumferential strain gauge wires (644-1, 644-2) that are formed around the rim of the strain gauge (104) with radial orientation of the strain sensing portion of the wires. The full-bridge strain gauge (104) also includes two radial strain gauge wires (644-3 644-4) that are interior to the circumferential wires (644-1; 644-2) with circumferential orientation of the strain sensing portion of the wires. Note that as depicted in FIG. 6, in some examples, the strain gauge (104) wire pattern occupies both the center and edge portions of the strain-gauge (104).

In one example; using such an electronic input device 1) may exhibit enhanced force sensing sensitivity; 2) may be more responsive to differentiations in user input force and direction; 3) may provide a user experience that more closely resembles a pen and paper experience; and 4) may protect the axial sensor from catastrophic failures. However, it is contemplated that the devices disclosed herein may address other matters and deficiencies in a number of technical areas.

What is claimed is:

1. An electronic input device, comprising:
   a scribing shaft disposed within a housing to translate along a longitudinal axis as a result of contact with a substrate; and
   an input sensor comprising:
      a plate secured within the housing, the plate to elastically deform responsive to the translation of the scribing shaft;
      a full-bridge strain gauge disposed on a surface of the plate, the full-bridge strain gauge to detect a deformation of the plate and output a corresponding signal, which corresponding signal varies dependent upon an amount of deformation of the plate; and
      a failure protection device to limit the deformation of the plate to within a predetermined amount, wherein the failure protection device comprises an annular housing to hold the plate and the full-bridge strain gauge.

2. The device of claim 1, wherein:
   the failure protection device comprises a shaft holder to hold, and translate with, the scribing shaft; and
   the shaft holder collides with the annular housing when a translation of the scribing shaft is greater than a predetermined amount, which collision prevents permanent deformation of the plate.

3. The device of claim 1, wherein:
   the failure protection device comprises:
      a shaft holder to hold, and translate with, the scribing shaft;
      a plunger to contact and deform the plate; and
      at least one spring disposed between the plunger and shaft holder to transmit and dampen the axial force from the scribing shaft to the plate; and
   the shaft holder collides with the annular housing when a translation of the scribing shaft is greater than a predetermined amount, which collision prevents permanent deformation of the plate.

4. The device of claim 1, wherein the failure protection device comprises:
   a magnetic ring on a first side of the plate to hold the plate in place against the axial force, wherein a magnetic force of the magnetic ring is overcome when an axial force greater than a predetermined amount is exerted against the plate; and
   a foam ring on a second side of the plate to return the plate to contact with the magnetic ring when the axial force is removed.

5. The device of claim 1, further comprising a rod to transmit the axial force from the scribing shaft to the plate.

6. The device of claim 1, wherein the plate is circumferentially-supported within the housing.

7. The device of claim 1, wherein the input sensor detects axial forces of less than 2.0 grams.

8. An electronic input device, comprising:
   a scribing shaft disposed within a housing to translate along a longitudinal axis as a result of contact with a substrate;
   an annular housing to retain a sensor, the sensor comprising:
      a plate to elastically deform responsive to the translation of the scribing shaft; and
      a full-bridge strain gauge to detect a deformation of the plate and output a corresponding signal;

a shaft holder to:
  hold, and translate with, the scribing shaft; and
  contact the annular housing when a predetermined contact force is reached to limit deformation of the plate to within a predetermined amount;
a plunger separated from the shaft holder, the plunger to press against, and deform, the plate responsive to the translation of the scribing shaft; and
a spring disposed between the plunger and the shaft holder, the spring to:
  transmit and dampen the axial force from the scribing shaft to the plate; and
  return the scribing shaft to an initial position in the absence of contact with the substrate.

9. The device of claim 8, wherein the plunger has a curved surface which contacts the plate.

10. The device of claim 8, wherein the full-bridge strain gauge comprises:
  two circumferential lateral strain gauges around a rim of the full-bridge strain gauge; and
  two interior radial strain gauges disposed on an interior of the circumferential lateral strain gauges.

11. The device of claim 8, wherein the full-bridge strain gauge is printed on the plate.

12. An electronic input system comprising:
  a housing which includes an opening through which a scribing shaft protrudes;
  an electronic input device at least partially disposed within the housing, the electronic input device comprising the scribing shaft; and
  a sensor device comprising:
    an annular housing to hold an axial sensor;
    the axial sensor disposed within the annular housing, the axial sensor comprising:
      a plate to elastically deform responsive to the translation of the scribing shaft;
      a full-bridge strain gauge to detect a deformation of the plate and output a corresponding signal, wherein the plate and full-bridge strain gauge are supported on bottom by the annular housing and supported on top by a cap; and
    a shaft holder to:
      hold, and translate with, the scribing shaft; and
      contact the annular housing when a predetermined contact force is reached to limit deformation of the plate to within a predetermined amount;
    a plunger to press against, and deform, the plate responsive to the translation of the scribing shaft;
    at least one spring to:
      transmit and dampen the axial force from the scribing shaft to the plate; and
      return the scribing shaft to an initial position in the absence of contact with the substrate; and
    circuitry to pass an output of the full-bridge strain gauge to a controller for executing an operation based on the axial force.

13. The system of claim 12, wherein the at least one spring comprises a single spring which, at rest, is in contact with the shaft holder and the annular housing.

14. The system of claim 12, wherein the at least one spring comprises two springs to operate sequentially.

15. The system of claim 14, wherein a first spring and a second spring have different spring constants.

16. The device of claim 4, further comprising a stop plate against which the foam ring compresses.

17. The device of claim 14, wherein at rest:
  the first spring contacts the shaft holder and the annular housing;
  the second spring contacts the shaft holder; and
  a gap exists between the second spring and the annular housing; and
  wherein the second spring contacts the annular housing when the first spring is fully compressed.

18. The device of claim 14, wherein a gap remains between the annular housing and the shaft holder when the first spring is compressed.

19. The device of claim 15, wherein the first spring absorbs an initial force before the second spring engages.

20. The device of claim 15, wherein the first spring has a lighter spring constant relative to a spring constant of the second spring.

* * * * *